(12) United States Patent
Fallahmohammadi et al.

(10) Patent No.: US 11,860,429 B2
(45) Date of Patent: Jan. 2, 2024

(54) OPTICAL-FIBER RIBBON WITH SPACED OPTICAL-FIBER UNITS

(71) Applicant: Prysmian S.p.A., Milan (IT)

(72) Inventors: Ehsan Fallahmohammadi, Columbia, SC (US); Clint Nicholaus Anderson, West Columbia, SC (US); Luca Giorgio De Rai, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 17/844,240

(22) Filed: Jun. 20, 2022

(65) Prior Publication Data

US 2022/0326461 A1 Oct. 13, 2022

Related U.S. Application Data

(63) Continuation-in-part of application No. 17/130,568, filed on Dec. 22, 2020, now Pat. No. 11,442,238.

(51) Int. Cl.
*G02B 6/44* (2006.01)
(52) U.S. Cl.
CPC ......... *G02B 6/4403* (2013.01); *G02B 6/4415* (2013.01)
(58) Field of Classification Search
CPC ..... G02B 6/4403; G02B 6/4404; G02B 6/448
See application file for complete search history.

(56) References Cited

U.S. PATENT DOCUMENTS

| | | | |
|---|---|---|---|
| 5,682,454 A | 10/1997 | Gaillard | |
| 5,720,908 A | 2/1998 | Gaillard | |
| 5,966,489 A | 10/1999 | Harwell et al. | |
| 6,381,390 B1 | 4/2002 | Hutton et al. | |
| 6,584,257 B1 | 6/2003 | Hurley et al. | |
| 6,853,783 B2 | 2/2005 | Chiasson et al. | |
| 7,623,747 B2 | 11/2009 | De Montmorillon et al. | |
| 7,889,960 B2 | 2/2011 | de Montmorillon et al. | |
| 7,995,889 B2 | 8/2011 | de Montmorillon et al. | |

(Continued)

FOREIGN PATENT DOCUMENTS

| | | |
|---|---|---|
| DE | 3502754 A1 | 7/1986 |
| DE | 3914014 A | 11/1990 |

(Continued)

OTHER PUBLICATIONS

Commonly owned U.S. Appl. No. 17/130,589, filed Dec. 22, 2020, pp. 1-57.

(Continued)

*Primary Examiner* — Omar R Rojas
(74) *Attorney, Agent, or Firm* — Additon, Pendleton & Witherspoon, P.A.

(57) ABSTRACT

An optical-fiber ribbon includes optical fibers (e.g., reduced-diameter optical fibers) arranged in parallel within optical-fiber units, wherein at least one adjacent pair of optical-fiber units is separated by a longitudinal adhesive-free spacing for a portion of the optical-fiber ribbon's length. Typically, each adjacent pair of optical-fiber units is separated by an adhesive-free spacing for a respective portion of the optical-fiber assembly's longitudinal length. In an exemplary embodiment, longitudinal adhesive-free spacings effectively increase the width of an optical-fiber ribbon formed of reduced-diameter optical fibers so that the optical-fiber ribbon achieves a more conventional optical-fiber ribbon width, thereby facilitating mass-fusion splicing using standard splicing equipment.

22 Claims, 6 Drawing Sheets

(56) References Cited

U.S. PATENT DOCUMENTS

| | | |
|---|---|---|
| 8,131,125 B2 | 3/2012 | de Montmorillon et al. |
| 8,145,025 B2 | 3/2012 | de Montmorillon et al. |
| 8,145,027 B2 | 3/2012 | Overton et al. |
| 8,265,442 B2 | 9/2012 | Overton |
| 8,385,705 B2 | 2/2013 | Overton et al. |
| 8,428,414 B2 | 4/2013 | de Montmorillon et al. |
| 8,467,647 B2 | 6/2013 | Wells et al. |
| 8,548,294 B2 | 10/2013 | Toge et al. |
| 8,600,206 B2 | 12/2013 | Overton |
| 8,837,889 B2 | 9/2014 | de Montmorillon et al. |
| 9,086,555 B2 | 7/2015 | Namazue et al. |
| 9,110,265 B2 | 8/2015 | Wells et al. |
| 9,244,220 B2 | 1/2016 | Overton |
| 9,389,386 B2 | 7/2016 | Matsuzawa et al. |
| 9,541,722 B2 | 1/2017 | Sajima et al. |
| 9,880,368 B2 | 1/2018 | Debban et al. |
| 9,995,896 B2 | 6/2018 | Namazue et al. |
| 10,078,194 B2 | 9/2018 | Sajima et al. |
| 10,185,105 B2 | 1/2019 | Risch et al. |
| 10,185,110 B2 | 1/2019 | Risch et al. |
| 10,782,495 B2 | 9/2020 | Fallahmohammadi et al. |
| 10,884,213 B1 | 1/2021 | Fallahmohammadi et al. |
| 11,169,342 B2 | 11/2021 | Fallahmohammadi et al. |
| 11,256,051 B2 | 2/2022 | Fallahmohammadi et al. |
| 2003/0118301 A1 | 6/2003 | Hurley et al. |
| 2007/0127878 A1 | 6/2007 | Montmorillon et al. |
| 2009/0175583 A1 | 7/2009 | Overton |
| 2009/0279835 A1 | 11/2009 | de Montmorillon et al. |
| 2009/0279836 A1 | 11/2009 | de Montmorillon et al. |
| 2010/0067859 A1 | 3/2010 | de Montmorillon et al. |
| 2010/0119202 A1 | 5/2010 | Overton |
| 2010/0254658 A1 | 10/2010 | Tankaka et al. |
| 2010/0290781 A1 | 11/2010 | Overton et al. |
| 2011/0058779 A1 | 3/2011 | Wells et al. |
| 2011/0110635 A1 | 5/2011 | Toge et al. |
| 2011/0135264 A1 | 6/2011 | de Montmorillon et al. |
| 2011/0286710 A1 | 11/2011 | de Montmorillon et al. |
| 2012/0183268 A1 | 7/2012 | de Montmorillon et al. |
| 2012/0189258 A1 | 7/2012 | Overton et al. |
| 2013/0084146 A1 | 4/2013 | Speller et al. |
| 2013/0156390 A1 | 6/2013 | Matsuzawa et al. |
| 2013/0279866 A1 | 10/2013 | Wells et al. |
| 2014/0086548 A1 | 3/2014 | Overton |
| 2014/0112631 A1 | 4/2014 | Namazue et al. |
| 2016/0161692 A1 | 6/2016 | Namazue et al. |
| 2016/0299310 A1 | 10/2016 | Kaneko et al. |
| 2016/0356976 A1 | 12/2016 | Sajima et al. |
| 2017/0090135 A1 | 3/2017 | Sato et al. |
| 2017/0115461 A1 | 4/2017 | Namazue et al. |
| 2017/0184803 A1 | 6/2017 | Namazue et al. |
| 2017/0219790 A1 | 8/2017 | Debban et al. |
| 2017/0219792 A1 | 8/2017 | Debban et al. |
| 2018/0031792 A1 | 2/2018 | Risch et al. |
| 2018/0320003 A1 | 11/2018 | Chen |
| 2018/0371298 A1 | 12/2018 | Schmid et al. |
| 2019/0250347 A1 | 8/2019 | Fallahmohammadi et al. |
| 2020/0064574 A1 | 2/2020 | Fallahmohammadi et al. |
| 2020/0218020 A1 | 7/2020 | Namazue et al. |
| 2020/0271879 A1 | 8/2020 | Fallahmohammadi et al. |
| 2020/0379198 A1 | 12/2020 | Fallahmohammadi et al. |
| 2020/0386961 A1 | 12/2020 | Fallahmohammadi et al. |
| 2021/0063664 A1 | 3/2021 | Fallahmohammadi et al. |
| 2021/0141179 A1 | 5/2021 | Fallahmohammadi et al. |
| 2022/0026652 A1 | 1/2022 | Kuramitsu et al. |

FOREIGN PATENT DOCUMENTS

| | | |
|---|---|---|
| EP | 1043613 A1 | 10/2000 |
| EP | 1089105 A1 | 4/2001 |
| EP | 1143280 A1 | 10/2001 |
| EP | 2770357 A1 | 8/2014 |
| EP | 3614188 A1 | 2/2020 |
| FR | 2693560 A1 | 1/1994 |
| JP | 2003-232972 A | 8/2003 |
| JP | 2003-241041 A | 8/2003 |
| JP | 2010-44336 A | 2/2010 |
| JP | 2011-221199 A | 11/2011 |
| JP | 2012-027129 A | 2/2012 |
| JP | 2012-027130 A | 2/2012 |
| JP | 2012-103341 A | 5/2012 |
| JP | 2012-108331 A | 6/2012 |
| JP | 2014-010439 A | 1/2014 |
| JP | 2014-052519 A | 3/2014 |
| JP | 2015-021734 A | 2/2015 |
| JP | 2015-108756 A | 6/2015 |
| JP | 2016-075746 A | 5/2016 |
| JP | 2017-062431 A | 3/2017 |
| JP | 2017-134360 A | 8/2017 |
| JP | 2017-181513 A | 10/2017 |
| JP | 2020-024257 A | 2/2020 |
| RU | 2619397 C1 | 5/2017 |
| WO | 2012/023508 A1 | 2/2012 |
| WO | 2012/165371 A1 | 12/2012 |
| WO | 2017/175414 A1 | 10/2017 |
| WO | 2019/011417 A1 | 1/2019 |
| WO | 2019/011418 A1 | 1/2019 |
| WO | 2019/137627 A1 | 7/2019 |
| WO | 2019/137628 A1 | 7/2019 |
| WO | 2020/161971 A1 | 8/2020 |

OTHER PUBLICATIONS

Fujikura Ltd., Product Brochure for "Mass Fusion Splicer 90R12" (2019) https://www.fusionsplicer.fujikura.com, pp. 1-10.

Loctite Technical Data Sheet, "Loctite 3341", www.henkel.com/industrial, Oct. 2005, pp. 1-4.

DSM Product Data Sheet, "Cableite 9D9-287", Mar. 2007, www.dsmdesotech.com, pp. 1-2.

DSM Product Data Sheet, "Cableite 9D9-464", (no date) pp. 1.

DSM Product Data Sheet, "Cableite 9D9-518", Mar. 2007, Elgin, IL, pp. 1-3.

Loctite Technical Data Sheet, "Loctite SI 5240", www.henkel.com/industrial, Jan. 2015, pp. 1-4.

Extended European Search Report in counterpart European Application No. 21213137.9 dated Apr. 26, 2022, pp. 1-8.

OPTICAL-FIBER RIBBON WITH SPACED OPTICAL-FIBER UNITS

CROSS-REFERENCE TO PRIORITY APPLICATION

This application is a continuation-in-part of commonly assigned U.S. patent application Ser. No. 17/130,568 for an Optical-Fiber Ribbon with Spaced Optical-Fiber Units (filed Dec. 22, 2020), which is hereby incorporated by reference in its entirety.

FIELD OF THE INVENTION

The present invention relates to optical-fiber ribbons and methods for producing optical-fiber ribbons.

BACKGROUND

Optical fibers provide advantages over conventional communication lines. As compared with traditional wire-based networks, optical-fiber communication networks can transmit significantly more information at significantly higher speeds. The amount of data transmitted over optical-fiber cables is continuously increasing worldwide. This is especially so in data centers because of the expansion of cloud computing, which requires that data be received and transmitted in limited physical space. As such, there is an increasing demand for high-fiber-count and high-fiber-density optical cables. Moreover, there is persistent desire to reduce construction costs of access cable networks, making the reduction of optical-cable diameter and weight central to the use of existing facilities (e.g., underground ducts) to reduce installation costs. Another practical requirement is the ability to mass-fusion splice optical fibers to shorten the time required for connecting cables. This means that there are several—possibly conflicting—demands, such as decreasing optical-cable diameters, increasing optical-fiber density, and improving optical-cable workability. This is a serious and difficult challenge for optical-cable manufacturers.

To achieve easy workability, optical-fiber ribbons can preferentially be mass-fusion spliced to simultaneously make multiple optical-fiber connections. Conventional optical-fiber ribbons have the disadvantage of rigidity, however, because of the application of a resin layer around the optical-fiber assembly to keep the optical fibers in a parallel plane. This rigidity limits the possibility of increasing fiber density in optical-fiber cables.

It is well known to connect two optical fibers end-to-end by fusion splicing with a laser, electric arc, or the like. The splicing usually includes preparing each optical fiber's end portion by stripping the coatings (e.g., the outer secondary coating and inner primary coating) from each optical fiber's outer glass cladding and inner glass core, and precisely cleaving each optical fiber's outer glass cladding and inner glass core to yield a bare glass end to be spliced. Typically, the respective cleaved, bare glass ends are precisely aligned in a single-splice, fusion-splicing machine that joins the two optical fibers. The splice alignment and other accommodations help to minimize any attenuation at the splice and provide a strong connection between the spliced ends.

The single-splicing machine typically includes opposite holding mechanisms for respectively holding the optical fibers so that the cleaved, bare glass ends can be precisely aligned. To facilitate alignment, each holding mechanism (e.g., a single-fiber alignment chuck) can include a platform or tray defining a V-shaped groove for precisely retaining each optical fiber's cleaved, bare end portion. Additionally, each alignment chuck or holding mechanism can further include a portion for precisely securing each optical fiber's coated portion adjacent to the cleaved, bare end portion.

Similarly, it is well known to collectively splice two optical-fiber ribbons end-to-end by mass-fusion splicing. Each optical-fiber ribbon, for example, may include twelve optical fibers that are held together by adhesive material. Preparing each optical-fiber ribbon's end portion typically includes separating the constituent optical fibers' respective end portions and then preparing each optical fiber to yield bare glass end portions. For efficiency, the respective cleaved, bare glass ends are precisely aligned in a mass-fusion splicing machine that joins the respective optical fibers.

The mass-fusion splicing machine (e.g., a mass-fusion splicer) typically employs opposite holding mechanisms (e.g., alignment chucks) for respectively securing the optical fibers so that their cleaved, bare glass ends can be precisely aligned. To facilitate alignment, each alignment chuck or other holding mechanism can include a platform or tray respectively defining a plurality of V-shaped grooves (e.g., 12 grooves or 24 grooves) for precisely retaining each optical fiber's cleaved, bare end portion. Additionally, each alignment chuck or other holding mechanism can further include a part or a portion for precisely securing each optical fiber's coated portion adjacent to the cleaved, bare end portion.

Flexible optical-fiber ribbons yield increased optical-fiber density in optical-fiber cables. Mass splicing such flexible optical-fiber ribbons requires positioning the optical-fiber ribbons in alignment chucks of a mass-fusion splicing machine, but sometimes the adhesive bonds (e.g., elongated beads) may cause interference within the alignment chucks (e.g., the V-shaped grooves in the alignment chuck). For example, some commercially available alignment chucks (e.g., used in mass-fusion splicing machines) cannot readily accommodate flexible optical-fiber ribbons if the pitch of the adhesive-bead pattern is too short (e.g., less than about 100 millimeters), because of adhesive-bead interference in the alignment chucks' V-shaped grooves. Alternatively, if the pitch of the adhesive-bead pattern becomes too long, flexible optical-fiber ribbons can become very flexible and difficult to load into the alignment chucks. A solution requires applying tension to both ends of the optical-fiber ribbon and positioning the edge of the optical fiber at either end of the alignment chuck to achieve proper loading of the optical-fiber ribbon into the alignment chuck.

Moreover, flexible optical-fiber ribbons employing reduced-diameter optical fibers can further increase optical-fiber density in optical-fiber cables. Mass splicing flexible optical-fiber ribbons formed of reduced-diameter optical fibers is complicated, however, and some manufacturers have not commercialized mass-fusion splicing machines specifically designed for optical fibers having diameters of 200 microns or less. The choices for 200-micron mass-fusion splicing machines are limited (and the mass-fusion splicers are expensive, too), and using a conventional mass-fusion splicing machine designed for nominal 250-micron optical fibers to mass splice an optical-fiber ribbon formed of reduced-diameter optical fibers (e.g., including 180-micron and 200-micron optical fibers) introduces alignment problems. Splicing two optical-fiber ribbons that include reduced-diameter optical fibers (e.g., two 200-micron-optical-fiber ribbons)—or splicing two optical-fiber ribbons that respectively include reduced-diameter optical fibers (e.g., 180-micron and 200-micron optical fibers) and nominal 250-micron optical fibers—sometimes requires the use of a pitch-conversion optical-fiber holder to align the respective glass core and claddings (e.g., the respective 125-micron glass optical fibers). In brief, satisfactory alignment of the respective optical-fiber glass cores is difficult to achieve when mass fusion splicing ribbonized, reduced-diameter optical fibers using a conventional mass-fusion splicing machine designed for nominal 250-micron optical fibers.

SUMMARY

It is an exemplary object of the present invention to provide an optical-fiber ribbon having excellent flexibility, strength, and robustness to facilitate rolling or folding of the constituent optical fibers in the ribbon-width direction. It is another exemplary object of the present invention to provide an optical-fiber ribbon that can be readily mass-fusion spliced to make multiple optical-fiber connections.

In one aspect, the present invention embraces an optical-fiber ribbon that includes a plurality of respectively adjacent optical fibers (e.g., twelve or more reduced-diameter optical fibers, such as 180-micron optical fibers or 200-micron optical fibers) extending in a longitudinal direction and arranged in parallel to form an optical-fiber assembly having a width w extending crosswise to a longitudinal length of the optical-fiber assembly. The optical fibers are arranged in a plurality of respectively adjacent optical-fiber units. The optical-fiber ribbon further includes bonding material on the optical-fiber assembly (e.g., deposited on a major surface of the optical-fiber assembly, such as its upper planar surface) adhesively bonding adjacent optical-fiber units and the corresponding adjacent optical fibers in the optical-fiber assembly so that at least one adjacent pair of optical-fiber units is separated by an adhesive-free spacing for a portion of the optical-fiber assembly's longitudinal length. Typically, each adjacent pair of optical-fiber units is separated by an adhesive-free spacing for a respective portion of the optical-fiber assembly's longitudinal length.

An optical-fiber ribbon formed of reduced-diameter optical fibers might be too narrow for equipment used for mass-fusion splicing optical-fiber ribbons formed of conventional 250-micron optical fibers (e.g., the V-shaped grooves in standard alignment chucks are too widely spaced). The longitudinal adhesive-free spacings effectively increase the width of an optical-fiber ribbon formed of reduced-diameter optical fibers so that the optical-fiber ribbon achieves a more conventional optical-fiber ribbon width, which facilitates mass-fusion splicing using standard splicing equipment.

In a related aspect, the present invention embraces a method of making an optical-fiber ribbon. An exemplary method includes (i) arranging a plurality of optical fibers into a longitudinal optical-fiber assembly in which the optical fibers are distributed into a plurality of respectively adjacent optical-fiber units that are spatially separated from one another, the optical-fiber assembly having a width w extending crosswise to a longitudinal length of the optical-fiber assembly; (ii) advancing the longitudinal optical-fiber assembly at linear velocity v while maintaining spatial separation between adjacent optical-fiber units; and (iii) applying bonding material to the optical-fiber assembly to adhesively bond adjacent optical-fiber units and the corresponding adjacent optical fibers in the optical-fiber assembly while maintaining spatial separation between the adjacent optical-fiber units.

Exemplary optical-fiber ribbons have excellent flexibility, strength, and robustness to facilitate rolling or folding of the constituent optical fibers in the ribbon-width direction. In addition, exemplary optical-fiber ribbons can be mass-fusion spliced to make multiple optical-fiber connections, and individual optical fibers can be separated without damaging adjacent optical fibers. Each optical fiber typically includes, from its center to its periphery, a glass core, a glass cladding, and one or more coatings (e.g., a primary coating, a secondary coating, and an optional ink layer). As such, corresponding embodiments of the optical-fiber ribbon herein disclosed are applicable to the related method for making an optical-fiber ribbon, and vice versa.

The foregoing illustrative summary, other objectives and/or advantages of the present disclosure, and the manner in which the same are accomplished are further explained within the following detailed description and its accompanying drawings.

BRIEF DESCRIPTION OF THE DRAWINGS

The present invention is described hereinafter with reference to the accompanying drawings in which embodiments of the present invention are shown and in which like reference numbers indicate the same or similar elements. The drawings are provided as examples, may be schematic, and may not be drawn to scale. The present inventive aspects may be embodied in many different forms and should not be construed as limited to the examples depicted in the drawings.

DETAILED DESCRIPTION

Various aspects and features are herein described with reference to the accompanying figures. Details are set forth to provide a thorough understanding of the present disclosure. It will be apparent, however, to those having ordinary skill in the art that the disclosed optical-fiber ribbons and methods for producing optical-fiber ribbons may be practiced or performed without some or all of these specific details. As another example, features disclosed as part of one embodiment can be used in another embodiment to yield a further embodiment. Sometimes well-known aspects are not described in detail to avoid unnecessarily obscuring the present disclosure. This detailed description is thus not to be taken in a limiting sense, and it is intended that other embodiments are within the spirit and scope of the present disclosure.

In a first aspect, the present invention embraces an optical-fiber ribbon that includes a plurality n of respectively adjacent optical fibers (e.g., twelve or more reduced-diameter optical fibers, such as 180-micron optical fibers or 200-micron optical fibers) extending in a longitudinal direction and arranged in parallel to form an optical-fiber assembly, which has a width w extending crosswise to a longitudinal length of the optical-fiber assembly. The n optical fibers are arranged in a plurality U of respectively adjacent optical-fiber units (e.g., two, three, or four or more adjacent optical-fiber units). The optical-fiber ribbon further includes bonding material on the optical-fiber assembly (e.g., deposited on a major surface of the optical-fiber assembly, such as its upper planar surface) adhesively bonding adjacent optical-fiber units and the corresponding adjacent optical fibers in the optical-fiber assembly so that at least one adjacent pair of optical-fiber units is separated by an adhesive-free spacing for a portion of the optical-fiber assembly's longitudinal length. Typically, each adjacent pair of optical-fiber units is separated by a longitudinal adhesive-free spacing for a respective portion of the optical-fiber assembly's longitudinal length.

As noted, an optical-fiber ribbon formed of reduced-diameter optical fibers (e.g., 180-micron optical fibers or 200-micron optical fibers) might be too narrow for conventional equipment used for mass-fusion splicing optical-fiber ribbons formed of conventional 250-micron optical fibers (e.g., the V-shaped grooves in standard alignment chucks are too widely spaced for the reduced-diameter optical fibers). According to the present invention, the incorporation of longitudinal adhesive-free spacings in the optical-fiber assembly effectively increases the width of an optical-fiber ribbon formed of reduced-diameter optical fibers so that the optical-fiber ribbon achieves a more conventional optical-fiber ribbon width. This increased width facilitates mass-fusion splicing using a conventional mass-fusion splicing machine (e.g., mass fusion splicers designed for nominal 250-micron optical fibers) to mass splice an optical-fiber ribbon formed of reduced-diameter optical fibers (e.g., nominal 180-micron optical fibers and/or 200-micron optical fibers). For example, splicing two optical-fiber ribbons that include reduced-diameter optical fibers (e.g., two 180-micron or 200-micron optical-fiber ribbons)—or splicing two optical-fiber ribbons that respectively include reduced-diameter optical fibers (e.g., 180-micron optical fibers or 200-micron optical fibers) and nominal 250-micron optical fibers—can be achieved using a conventional mass-fusion splicing machine designed for nominal 250-micron optical fibers without the use of additional equipment (e.g., a pitch-conversion optical-fiber holder).

In a related second aspect, the present invention embraces a method of making an optical-fiber ribbon with adhesive-free spacings (e.g., longitudinal gaps along a portion of the optical-fiber assembly). An exemplary method includes (i) arranging a plurality n of optical fibers into a longitudinal optical-fiber assembly in which the n optical fibers are distributed into a plurality U of respectively adjacent optical-fiber units that are spatially separated from one another, the optical-fiber assembly having a width w extending crosswise to a longitudinal length of the optical-fiber assembly; (ii) advancing the longitudinal optical-fiber assembly at linear velocity v while maintaining spatial separation between adjacent optical-fiber units; and (iii) applying bonding material to the optical-fiber assembly to adhesively bond adjacent optical-fiber units and the corresponding adjacent optical fibers in the optical-fiber assembly while maintaining spatial separation between the adjacent optical-fiber units. In an exemplary process embodiment, the n optical fibers are passed through an alignment die (e.g., an aggregating die), which is configured to provide spatial separation between adjacent optical-fiber units, to provide the plurality U of respectively adjacent optical-fiber units.

The bonding material may be applied to the optical-fiber assembly as a continuous bead or as discontinuous beads, such as disclosed in commonly assigned U.S. Pat. No. 10,782,495 and commonly assigned U.S. Pat. No. 11,256,051, each of which is hereby incorporated by reference in its entirety. For example, for a portion of the optical-fiber assembly's longitudinal length, the bonding material may be applied as a plurality of successive rectilinear beads arranged lengthwise along the optical-fiber assembly (e.g., the successive beads forming a stepwise pattern across the optical-fiber assembly), so that the adhesive beads are configured to form elongated bonds between adjacent optical fibers in the optical-fiber assembly.

In an exemplary embodiment, the bonding material has an elongation at break of at least 150 percent, typically between 200 percent and 300 percent, such as between 200 percent and 250 percent. In an exemplary embodiment, the bonding material has a modulus of elasticity (or Young's modulus) of between 1 MPa and 50 MPa (e.g., between 5 MPa and 45 MPa), such as between 1 MPa and 10 MPa, between 10 MPa and 20 MPa, between 15 MPa and 30 MPa, or between 20 MPa and 40 MPa. In another exemplary embodiment, the bonding material has a modulus of elasticity (or Young's modulus) of between 1 MPa and 15 MPa, such as between 1 MPa and 10 MPa (e.g., between about 5 MPa and 10 MPa, such as between 6 MPa and 9 MPa). In yet another exemplary embodiment, the bonding material has a modulus of elasticity (or Young's modulus) of between 15 MPa and 40 MPa, such as between 20 MPa and 35 MPa (e.g., about 20-25 MPa).

In this regard, and as discussed in commonly assigned U.S. Pat. No. 11,256,051, elongation at break (e.g., strain at break) and modulus of elasticity can be measured on a dog-bone-shaped film sample using the following method: ASTM D638-14 ("*Standard Test Method for Tensile Properties of Plastics*"), which is hereby incorporated by reference in its entirety. In exemplary embodiments, the bonding material is a substantially fully cured curable adhesive (e.g., at least about 95 percent cured, such as about 98 percent cured), and the bonding material positioned in situ on an optical-fiber ribbon reflects these bonding-material properties.

An exemplary method for applying either a continuous bead of bonding material or discontinuous beads of bonding material to an optical-fiber assembly in a way that facilitates faster line speeds during the manufacturing of optical-fiber ribbons is disclosed in commonly assigned U.S. patent application Ser. No. 16/683,827 for an Optical-Fiber Ribbon with Distorted Sinusoidal Adhesive Pattern and Method Therefor, now U.S. Pat. No. 10,884,213, each of which is hereby incorporated by reference in its entirety.

Figure 1:
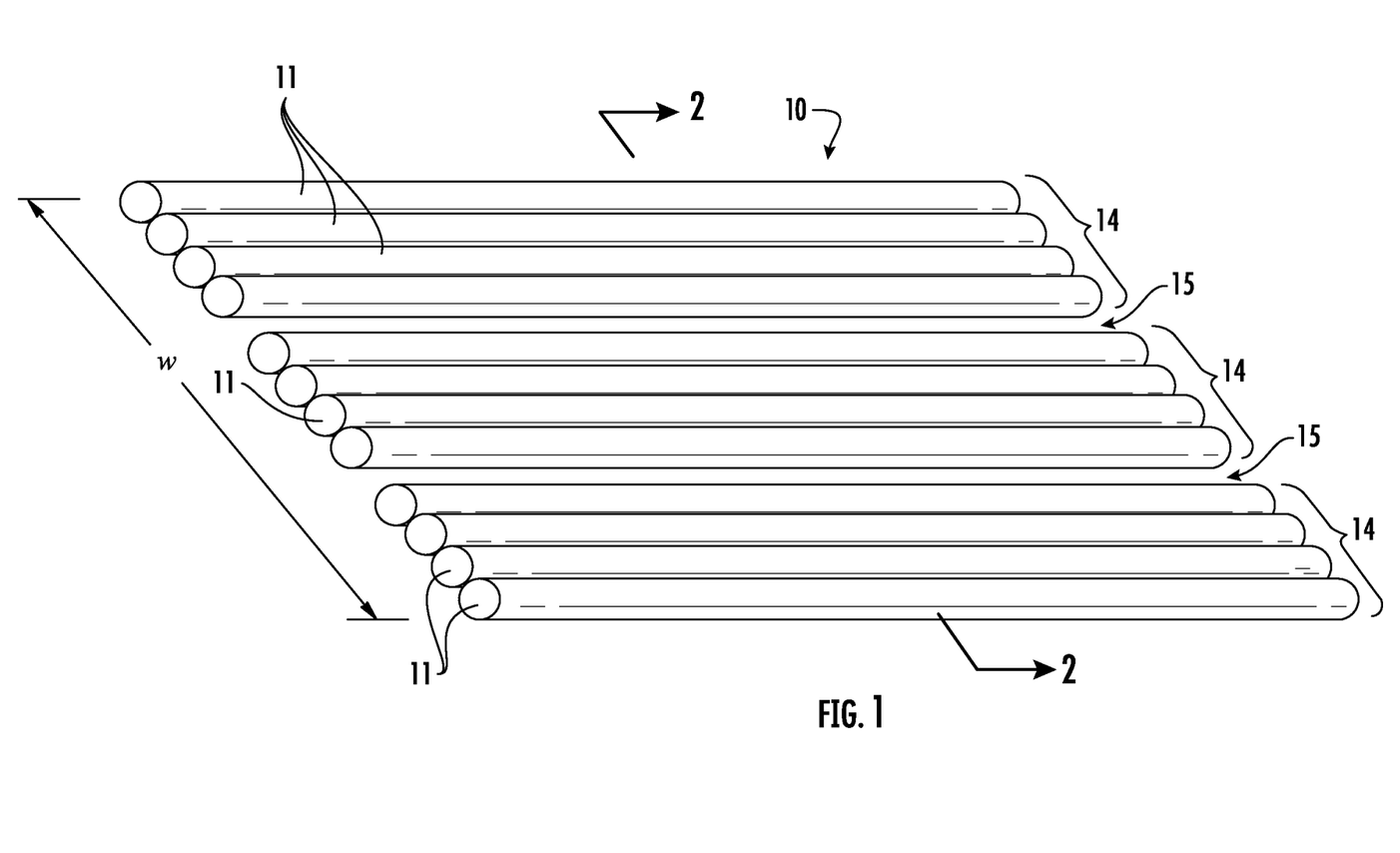
FIG. 1 is a pictorial view of a section of an exemplary optical-fiber assembly in accordance with a first embodiment of this disclosure.
Figure 2:
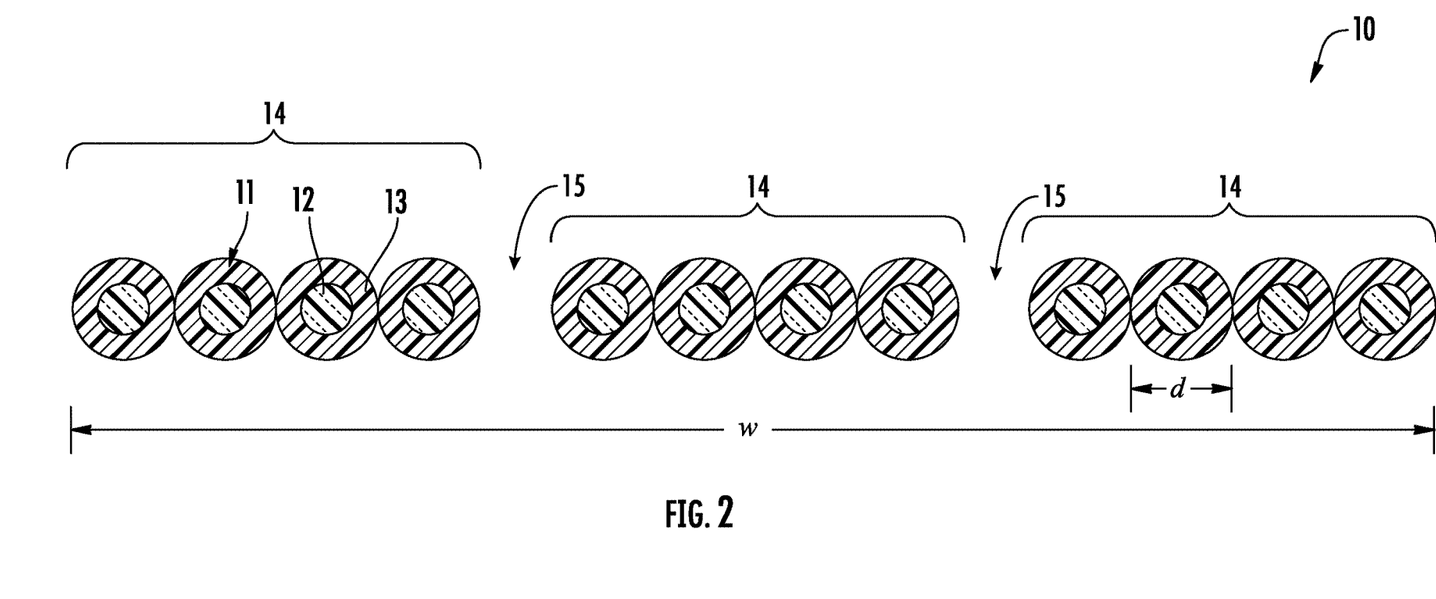
FIG. 2 is a cross-sectional view taken along line 2-2 of FIG. 1.
Figure 3:
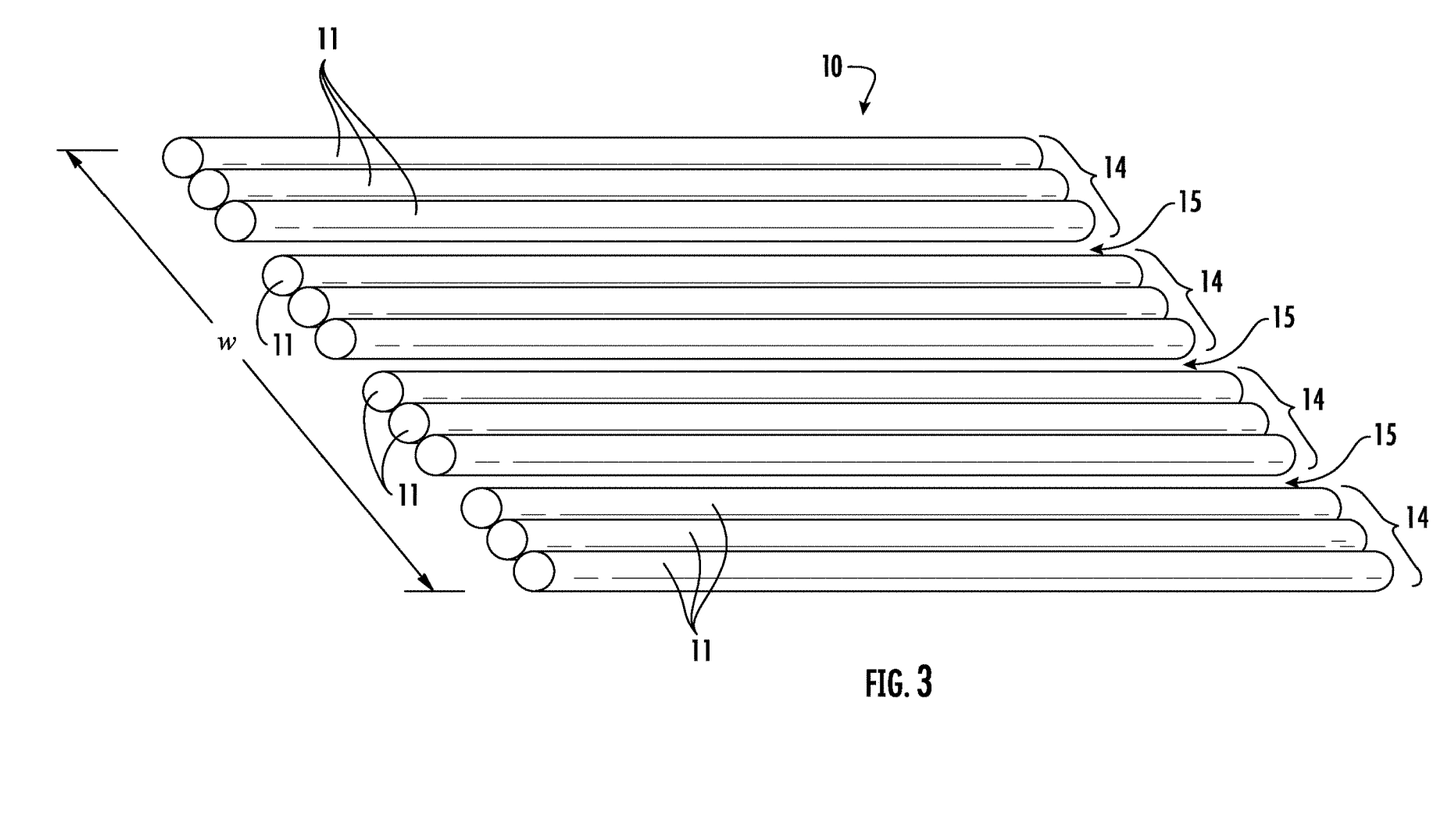
FIG. 3 is a pictorial view of a section of an exemplary optical-fiber assembly in accordance with a second embodiment of this disclosure.

As depicted in FIGS. 1-3, an exemplary optical-fiber assembly 10 includes a plurality of optical fibers 11 arranged side-by-side such that the optical fibers 11 are substantially parallel to one another. Each optical fiber 11 may be closely spaced or contiguous with an adjacent optical fiber 11 within an optical-fiber unit 14 but typically should not cross over one another along the length of the optical-fiber assembly 10. Optical fibers 11 usually include a component glass fiber 12 and one or more surrounding coating layers 13. See FIG. 2. Those having ordinary skill in the art will understand the various kinds of primary coatings, secondary coatings, and ink layers, as well as the structures and thicknesses thereof. This application hereby incorporates by reference commonly owned U.S. Pat. No. 8,265,442 for a Microbend- Resistant Optical Fiber and U.S. Pat. No. 8,600,206 for a Reduced-Diameter Optical Fiber.

Figure 4:
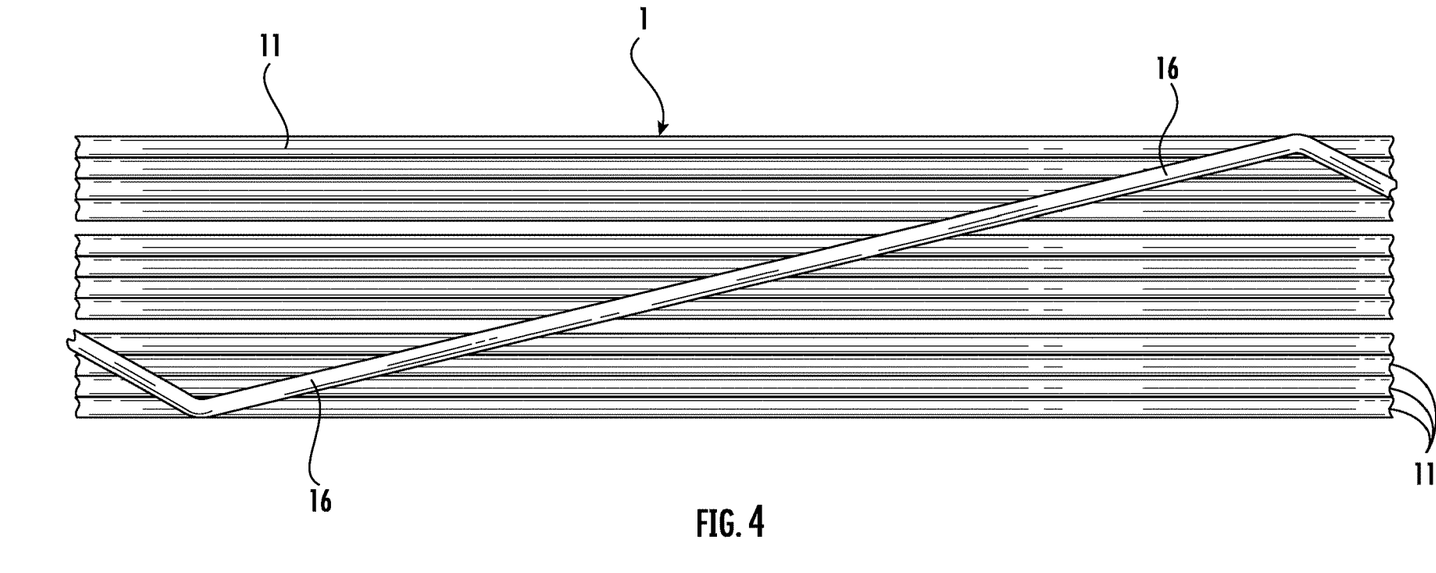
FIG. 4 is a top plan view of an optical-fiber ribbon in accordance with the first embodiment of this disclosure.

FIG. 4 depicts an exemplary optical-fiber ribbon 1, such as formed from an exemplary optical-fiber assembly 10 as depicted in FIGS. 1-2, further including a continuous bead 16 of bonding material (e.g., deposited in a zigzag-like pattern) on the optical-fiber assembly 10 to adhesively bond adjacent optical-fiber units 14 and the corresponding adjacent optical fibers 11. The optical-fiber assembly 10 (and the resulting optical-fiber ribbon 1) have a substantially planar (i.e., flattened) geometry that defines a relatively narrow height, a relatively wide width, and a substantially continuous length (e.g., over 1,000 meters, such as 5,000 meters or more). As illustrated in FIG. 4, each adhesive-free spacing 15 extends along a respective portion of the optical-fiber assembly's longitudinal length but is disrupted as the continuous bead 16 of bonding material (or other adhesive-bead pattern) crosses between respective, adjacent optical-fiber units 14.

The exemplary optical-fiber assembly 10 depicted in FIGS. 1-2 includes three (3) optical-fiber units 14 separated by two (2) adhesive-free spacings 15 (e.g., a 3×4 configuration). That is, each adjacent pair of optical-fiber units is spaced from one another for a portion of the optical-fiber assembly's longitudinal length by a longitudinal adhesive-free spacing 15. Similarly, exemplary optical-fiber assembly 10 depicted in FIG. 3 includes four (4) optical-fiber units 14 separated by three (3) adhesive-free spacings 15 (e.g., a 4×3 configuration). Typically, the n optical fibers are uniformly distributed into the U optical-fiber units whereby each of the U optical-fiber units has the same number $u_n$ of optical fibers, such as depicted in FIGS. 1-3. That said, it is within the scope of the invention to unevenly distribute the optical fibers within the optical-fiber units.

As used herein, an optical-fiber assembly 10 as depicted in FIGS. 1-3 inherently defines an upper side (i.e., the top), a lower side (i.e., the bottom), a left edge, and a right edge. The respective upper and lower sides define the major surfaces of the optical-fiber assembly 10 (and the resulting optical-fiber ribbon 1). Those having ordinary skill in the art will appreciate that flipping the optical-fiber assembly 180 degrees over its major transverse axis will reverse the top and bottom, and so the terms can be used interchangeably herein depending on the frame of reference. Similarly, those having ordinary skill in the art will appreciate that yaw rotating the optical-fiber assembly 180 degrees will reverse the right edge and left edge, and so the terms can be used interchangeably herein depending on the frame of reference. Accordingly, as used herein, terms such as "first side" and "second, opposite side" refer to the respective upper and lower sides of the optical-fiber assembly 10 (and the resulting optical-fiber ribbon), or vice versa depending on the frame of reference.

In an exemplary embodiment, each optical fiber has a reduced diameter d of between 150 microns and 230 microns, more typically between about 180 microns and 200 microns. Alternatively, the optical fibers may have a conventional diameter d, such as between about 240 microns and 260 microns. In an exemplary embodiment, the optical-fiber assembly includes between six and 36 optical fibers (including 6 and 36), such as between twelve and 24 optical fibers (including 12 and 24). Typically, each optical fiber in an optical-fiber ribbon has a substantially circular cross section, and all the optical fibers in an optical-fiber ribbon have substantially the same nominal diameter. By way of further example, the n optical fibers in the optical-fiber assembly are usually arranged in a plurality U of respectively adjacent optical-fiber units (e.g., two, three, or four or more adjacent optical-fiber units). Typically, the n optical fibers (e.g., between six and 36 optical fibers, such as between twelve and 24 optical fibers) are uniformly distributed into the U optical-fiber units whereby each of the U optical-fiber units has the same number $u_n$ of optical fibers (e.g., two, three, four, six, twelve, or eighteen optical fibers in each optical fiber unit whereby $u_n$=2, 3, 4, 6, 12, or 18).

As shown in FIGS. 1-3, each adjacent pair of optical-fiber units 14 is separated by an adhesive-free spacing 15 for a respective portion of the optical-fiber assembly's longitudinal length. The respective adhesive-free spacings between adjacent optical-fiber units have a mean width $S_{avg}$. In an exemplary embodiment, the n optical fibers 11 (e.g., twelve reduced-diameter optical fibers) have a mean diameter $d_{avg}$, such as 180 microns or 200 microns, and the respective adhesive-free spacings have a mean width $S_{avg}$ that is at least 50 percent (e.g., at least 75 percent) of the mean diameter $d_{avg}$ of the n optical fibers. In another exemplary embodiment, the n optical fibers (e.g., twelve reduced-diameter optical fibers) have a mean diameter $d_{avg}$, such as 180 microns or 200 microns, and the respective adhesive-free spacings have a mean width $S_{avg}$ that is at least 100 percent (e.g., at least 150 percent) of the mean diameter $d_{avg}$ of the n optical fibers.

By way of comparison, optical fibers may be arranged in parallel and respectively adjacent to each other in a plane (i.e., contiguously positioned within an optical-fiber ribbon). Because no adhesive-free spacings (e.g., longitudinal gaps between adjacent optical-fiber units) are present in a comparative optical-fiber ribbon, the nominal width w of the optical-fiber ribbon reflects the number n and diameter d of the optical fibers (i.e., w≈n×d). The widths w of such comparative optical-fiber ribbons are typically between about 2 millimeters and 10 millimeters (e.g., between 2 millimeters and 6 millimeters, such as about 3 millimeters). In practice, the optical fibers are substantially contiguous to one another, although some small gaps may exist between adjacent optical fibers. The width of the resulting comparative optical-fiber ribbon corresponds to the width w of the comparative optical-fiber assembly.

For example, a comparative optical-fiber ribbon (without adhesive-free spacings or other longitudinal gaps) formed of twelve (12) conventional optical fibers having a mean diameter $d_{250}$ of 250 microns yields a nominal width w of 3000 microns (i.e., 3 millimeters). Similarly, a comparative optical-fiber ribbon (without adhesive-free spacings or other longitudinal gaps) formed of twelve (12) reduced-diameter optical fibers having a mean diameter d of 200 microns yields a nominal width w of 2400 microns (i.e., 2.4 millimeters), and a comparative optical-fiber ribbon (without adhesive-free spacings or other longitudinal gaps) formed of twelve (12) reduced-diameter optical fibers having a mean diameter d of 180 microns yields a nominal width w of 2160 microns (i.e., 2.16 millimeters).

As noted, the incorporation of lengthwise adhesive-free spacings in the optical-fiber assembly in accordance with the present disclosure effectively increases the width of an optical-fiber ribbon formed of reduced-diameter optical fibers so that the optical-fiber ribbon achieves a more conventional optical-fiber ribbon width (e.g., closer to 3000 microns for a 12-optical-fiber ribbon). Increasing the width of an optical-fiber ribbon formed of reduced-diameter optical fibers via adhesive-free spacings facilitates mass-fusion splicing using a conventional mass-fusion splicing machine (e.g., mass fusion splicers designed for nominal 250-micron optical fibers), such as to mass-fusion splice an optical-fiber ribbon formed of reduced-diameter optical fibers (e.g., nominal 180-micron optical fibers and/or 200-micron optical fibers).

In exemplary embodiments, sufficient longitudinal gaps (e.g., adhesive-free spacing) are introduced (e.g., designed) into an optical-fiber ribbon formed of reduced-diameter optical fibers to close the differential with a conventional optical-fiber ribbon (e.g., formed of conventional optical fibers having a mean diameter $d_{250}$ of about 250 microns) by about 50 percent or more (at least 60 percent or 70 percent) such as 80 percent or more (e.g., at least 90 percent or 100 percent). For example, an optical-fiber ribbon formed of twelve (12) reduced-diameter optical fibers having a mean diameter d of 200 microns might include total spacing (e.g., adhesive-free spacings or other longitudinal gaps) that increases the nominal width from 2400 microns (without adhesive-free spacings or other longitudinal gaps) to at least 2700 microns (e.g., between about 2800 microns and 3000 microns).

Table 1 (below) provides the increased nominal width of prophetic optical-fiber ribbons formed of twelve (12) reduced-diameter optical fibers having a mean diameter $d_{avg}$ of 200 microns as compared with a similar optical-fiber ribbon without any adhesive-free spacings ("no spacing"). Here, each exemplary optical-fiber ribbon includes three optical-fiber units (U=3) having four reduced-diameter optical fibers ($u_n$=4) arranged contiguously within each optical-fiber unit, such as the 3×4 configuration depicted in FIGS. 1-2:

TABLE 1

| $S_{avg} \div d_{avg}$ | $S_{avg}$ (μ) | $d_{avg}$ (μ) | U × $u_n$ | ribbon width (μ) |
|---|---|---|---|---|
| no spacing | 0 | 200 | — | 2400 |
| 10% | 20 | 200 | 3 × 4 | 2440 |
| 20% | 40 | 200 | 3 × 4 | 2480 |
| 30% | 60 | 200 | 3 × 4 | 2520 |
| 40% | 80 | 200 | 3 × 4 | 2560 |
| 50% | 100 | 200 | 3 × 4 | 2600 |
| 60% | 120 | 200 | 3 × 4 | 2640 |
| 70% | 140 | 200 | 3 × 4 | 2680 |
| 80% | 160 | 200 | 3 × 4 | 2720 |
| 90% | 180 | 200 | 3 × 4 | 2760 |
| 100% | 200 | 200 | 3 × 4 | 2800 |
| 110% | 220 | 200 | 3 × 4 | 2840 |
| 120% | 240 | 200 | 3 × 4 | 2880 |
| 130% | 260 | 200 | 3 × 4 | 2920 |
| 140% | 280 | 200 | 3 × 4 | 2960 |
| 150% | 300 | 200 | 3 × 4 | 3000 |
| 160% | 320 | 200 | 3 × 4 | 3040 |
| 170% | 340 | 200 | 3 × 4 | 3080 |
| 180% | 360 | 200 | 3 × 4 | 3120 |
| 190% | 380 | 200 | 3 × 4 | 3160 |

Table 2 (below) provides the increased nominal width of prophetic optical-fiber ribbons formed of twelve (12) reduced-diameter optical fibers having a mean diameter $d_{avg}$ of 200 microns as compared with a similar optical-fiber ribbon without any adhesive-free spacings ("no spacing"). Here, each exemplary optical-fiber ribbon includes four optical-fiber units (U=4) having three reduced-diameter optical fibers ($u_n$=3) arranged contiguously within each optical-fiber unit, such as the 4×3 configuration depicted in FIG. 3:

TABLE 2

| $S_{avg} \div d_{avg}$ | $S_{avg}$ (μ) | $d_{avg}$ (μ) | U × $u_n$ | ribbon width (μ) |
|---|---|---|---|---|
| no spacing | 0 | 200 | — | 2400 |
| 10% | 20 | 200 | 4 × 3 | 2460 |
| 20% | 40 | 200 | 4 × 3 | 2520 |
| 30% | 60 | 200 | 4 × 3 | 2580 |
| 40% | 80 | 200 | 4 × 3 | 2640 |
| 50% | 100 | 200 | 4 × 3 | 2700 |
| 60% | 120 | 200 | 4 × 3 | 2760 |
| 70% | 140 | 200 | 4 × 3 | 2820 |
| 80% | 160 | 200 | 4 × 3 | 2880 |
| 90% | 180 | 200 | 4 × 3 | 2940 |
| 100% | 200 | 200 | 4 × 3 | 3000 |
| 110% | 220 | 200 | 4 × 3 | 3060 |
| 120% | 240 | 200 | 4 × 3 | 3120 |
| 130% | 260 | 200 | 4 × 3 | 3180 |

Comparing Table 1 and Table 2 illustrates that, all things being equal, increasing the number of optical-fiber units (and thus the corresponding number of gaps between adjacent optical-fiber units) increases the nominal width of the optical-fiber ribbon formed of reduced-diameter optical fibers (e.g., having a mean diameter $d_{avg}$ of 200 microns).

Table 3 (below) provides the increased nominal width of prophetic optical-fiber ribbons formed of twelve (12) reduced-diameter optical fibers having a mean diameter $d_{avg}$ of 180 microns as compared with a similar optical-fiber ribbon without any adhesive-free spacings ("no spacing"). Here, each exemplary optical-fiber ribbon includes three optical-fiber units (U=3) having four reduced-diameter optical fibers ($u_n$=4) arranged contiguously within each optical-fiber unit, such as the 3×4 configuration depicted in FIGS. 1-2:

TABLE 3

| $S_{avg} \div d_{avg}$ | $S_{avg}$ (μ) | $d_{avg}$ (μ) | U × $u_n$ | ribbon width (μ) |
|---|---|---|---|---|
| no spacing | 0 | 180 | — | 2160 |
| 10% | 18 | 180 | 3 × 4 | 2196 |
| 20% | 36 | 180 | 3 × 4 | 2232 |
| 30% | 54 | 180 | 3 × 4 | 2268 |
| 40% | 72 | 180 | 3 × 4 | 2304 |
| 50% | 90 | 180 | 3 × 4 | 2340 |
| 60% | 108 | 180 | 3 × 4 | 2376 |
| 70% | 126 | 180 | 3 × 4 | 2412 |
| 80% | 144 | 180 | 3 × 4 | 2448 |
| 90% | 162 | 180 | 3 × 4 | 2484 |
| 100% | 180 | 180 | 3 × 4 | 2520 |
| 110% | 198 | 180 | 3 × 4 | 2556 |
| 120% | 216 | 180 | 3 × 4 | 2592 |
| 130% | 234 | 180 | 3 × 4 | 2628 |
| 140% | 252 | 180 | 3 × 4 | 2664 |
| 150% | 270 | 180 | 3 × 4 | 2700 |
| 160% | 288 | 180 | 3 × 4 | 2736 |
| 170% | 306 | 180 | 3 × 4 | 2772 |
| 180% | 324 | 180 | 3 × 4 | 2808 |
| 190% | 342 | 180 | 3 × 4 | 2844 |
| 200% | 360 | 180 | 3 × 4 | 2880 |
| 210% | 378 | 180 | 3 × 4 | 2916 |
| 220% | 396 | 180 | 3 × 4 | 2952 |
| 230% | 414 | 180 | 3 × 4 | 2988 |
| 240% | 432 | 180 | 3 × 4 | 3024 |
| 250% | 450 | 180 | 3 × 4 | 3060 |
| 260% | 468 | 180 | 3 × 4 | 3096 |
| 270% | 486 | 180 | 3 × 4 | 3132 |
| 280% | 504 | 180 | 3 × 4 | 3168 |

Table 4 (below) provides the increased nominal width of prophetic optical-fiber ribbons formed of twelve (12) reduced-diameter optical fibers having a mean diameter $d_{avg}$ of 180 microns as compared with a similar optical-fiber ribbon without any adhesive-free spacings ("no spacing").

Here, each exemplary optical-fiber ribbon includes four optical-fiber units (U=4) having three reduced-diameter optical fibers ($u_n$=3) arranged contiguously within each optical-fiber unit, such as the 4×3 configuration depicted in FIG. 3:

TABLE 4

| $S_{avg} \div d_{avg}$ | $S_{avg}$ (μ) | $d_{avg}$ (μ) | U × $u_n$ | ribbon width (μ) |
|---|---|---|---|---|
| no spacing | 0 | 180 | — | 2160 |
| 10% | 18 | 180 | 4 × 3 | 2214 |
| 20% | 36 | 180 | 4 × 3 | 2268 |
| 30% | 54 | 180 | 4 × 3 | 2322 |
| 40% | 72 | 180 | 4 × 3 | 2376 |
| 50% | 90 | 180 | 4 × 3 | 2430 |
| 60% | 108 | 180 | 4 × 3 | 2484 |
| 70% | 126 | 180 | 4 × 3 | 2538 |
| 80% | 144 | 180 | 4 × 3 | 2592 |
| 90% | 162 | 180 | 4 × 3 | 2646 |
| 100% | 180 | 180 | 4 × 3 | 2700 |
| 110% | 198 | 180 | 4 × 3 | 2754 |
| 120% | 216 | 180 | 4 × 3 | 2808 |
| 130% | 234 | 180 | 4 × 3 | 2862 |
| 140% | 252 | 180 | 4 × 3 | 2916 |
| 150% | 270 | 180 | 4 × 3 | 2970 |
| 160% | 288 | 180 | 4 × 3 | 3024 |
| 170% | 306 | 180 | 4 × 3 | 3078 |
| 180% | 324 | 180 | 4 × 3 | 3132 |
| 190% | 342 | 180 | 4 × 3 | 3186 |

Comparing Table 3 and Table 4 illustrates that, all things being equal, increasing the number of optical-fiber units (and thus the corresponding number of gaps between adjacent optical-fiber units) increases the nominal width of the optical-fiber ribbon formed of reduced-diameter optical fibers (e.g., having a mean diameter $d_{avg}$ of 180 microns).

In a related aspect, the present invention embraces targeting mean gap width $S_{avg}$ of the respective longitudinal adhesive-free spacings for an optical-fiber ribbon as a function of the number and nominal width (e.g., 250 microns) of a conventional optical fiber. In an exemplary embodiment, the optical-fiber ribbon includes a plurality n of respectively adjacent optical fibers (e.g., twelve or more reduced-diameter optical fibers, such as 180-micron optical fibers or 200-micron optical fibers) extending in a longitudinal direction and arranged in parallel to form an optical-fiber assembly, which has a width w extending crosswise to a longitudinal length of the optical-fiber assembly. The n optical fibers have the same nominal diameter d and are uniformly distributed into a plurality U of respectively adjacent optical-fiber units (e.g., each optical-fiber unit has the same number of optical fibers $u_n$). The optical-fiber ribbon further includes bonding material on the optical-fiber assembly (e.g., deposited on a major surface of the optical-fiber assembly, such as its upper planar surface) adhesively bonding adjacent optical-fiber units and the corresponding adjacent optical fibers in the optical-fiber assembly so that each adjacent pair of optical-fiber units is separated by a longitudinal adhesive-free spacing for a respective portion of the optical-fiber assembly's longitudinal length. The respective longitudinal adhesive-free spacings within the optical-fiber assembly (and the resulting optical-fiber ribbon) have a mean gap width $S_{avg}$, wherein:

$S_{avg} \geq (f \cdot n \cdot (d_{250}-d)) \div (U-1)$, where $f$ is a factor representing the amount of spacing within the optical-fiber assembly and $d_{250}$ is 250 microns, the nominal width of a conventional optical fiber.

In this regard, one or more longitudinal gaps are incorporated to provide corresponding adhesive-free spacing(s) between each adjacent pair of optical-fiber units, and the respective adhesive-free spacings typically have an exemplary mean gap width $S_{avg}$ that is at least 50 percent of the mean diameter $d_{avg}$ of the n optical fibers. Depending upon the number U of respectively adjacent optical-fiber units, such as two or more optical-fiber units having the same number of optical fibers $u_n$, the f factor, which is related to the spacing within the optical-fiber assembly, is typically at least 10 percent (e.g., f≥0.1, such as f≥0.15 or f≥0.2). In some embodiments, the f factor is at least 25 percent (e.g., f≥0.25, such as f≥0.3, f≥0.4, or f≥0.5). The adhesive-free spacings can facilitate separating the respective optical-fiber units from one another without damaging the optical fibers within the corresponding optical-fiber units.

As noted, in exemplary embodiments, sufficient longitudinal gaps (e.g., adhesive-free spacing) are incorporated into an optical-fiber ribbon formed of reduced-diameter optical fibers (e.g., optical fibers having nominal diameter d of between about 180 microns and 200 microns) to close the differential with a conventional optical-fiber ribbon (e.g., formed of conventional optical fibers having a mean diameter $d_{250}$ of about 250 microns) by about 50 percent or more (e.g., f≥0.5, such as f≥0.7), or even 75 percent or more (e.g., f≥0.75, such as f≥0.95). For example, an optical-fiber ribbon formed of twelve (12) reduced-diameter optical fibers having a mean diameter d of 200 microns might have an f factor of at least 0.5 to provide total spacing (e.g., adhesive-free spacings or other longitudinal gaps) to increase the optical-fiber ribbon's nominal width from 2400 microns (without adhesive-free spacings or other longitudinal gaps) to at least 2700 microns (e.g., between about 2800 microns and 3000 microns). Similarly, an optical-fiber ribbon formed of twelve (12) reduced-diameter optical fibers having a mean diameter d of 180 microns might have (i) an f factor of at least 0.5 to provide total spacing (e.g., adhesive-free spacings or other longitudinal gaps) to increase the optical-fiber ribbon's nominal width from 2160 microns (without adhesive-free spacings or other longitudinal gaps) to at least 2580 microns (e.g., between about 2600 microns and 2800 microns) or (ii) an f factor of at least 0.7 to provide total spacing (e.g., adhesive-free spacings or other longitudinal gaps) to increase its nominal width from 2160 microns (without adhesive-free spacings or other longitudinal gaps) to at least about 2750 microns (e.g., between about 2800 microns and 3000 microns).

Figure 5:
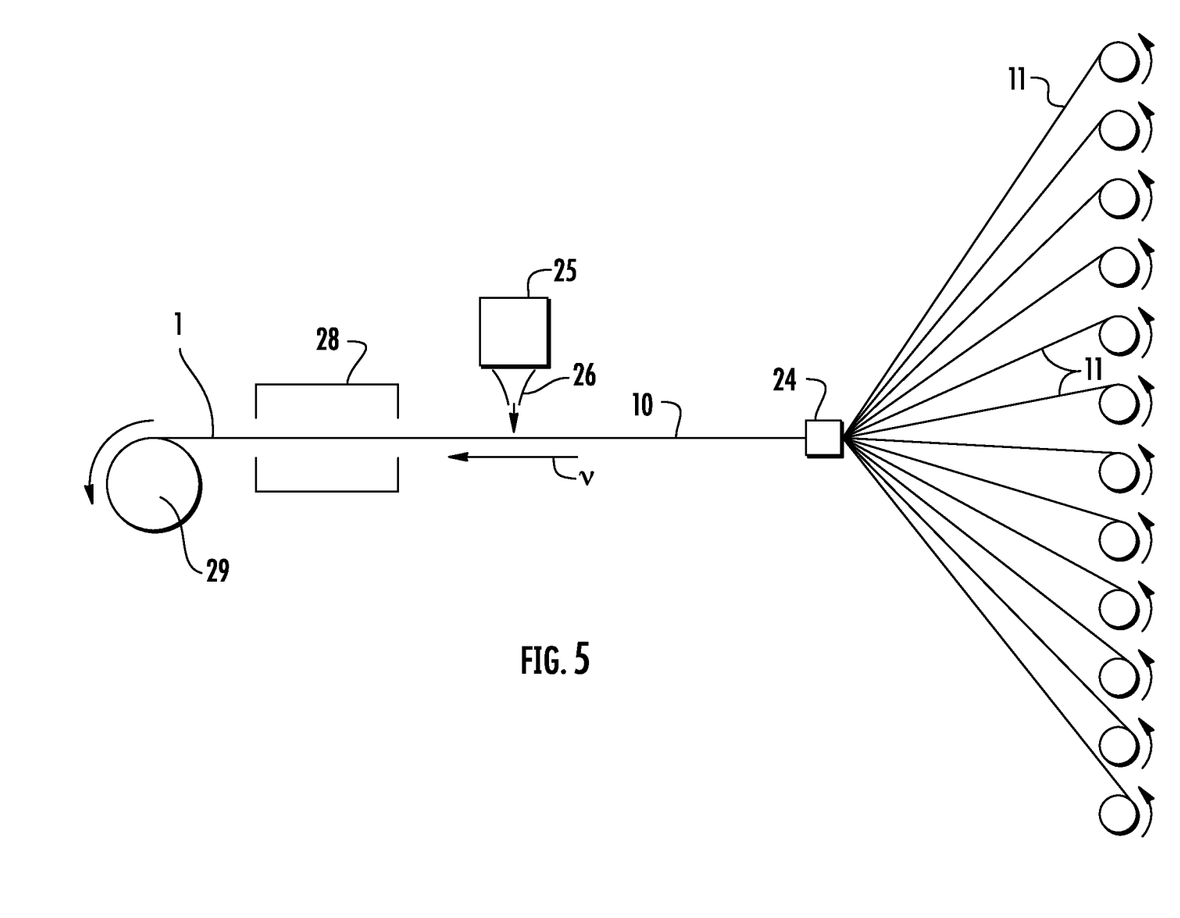
FIG. 5 is a side elevation view depicting an exemplary method of making an optical-fiber ribbon in accordance with the first and second embodiments of this disclosure.
Figure 6:
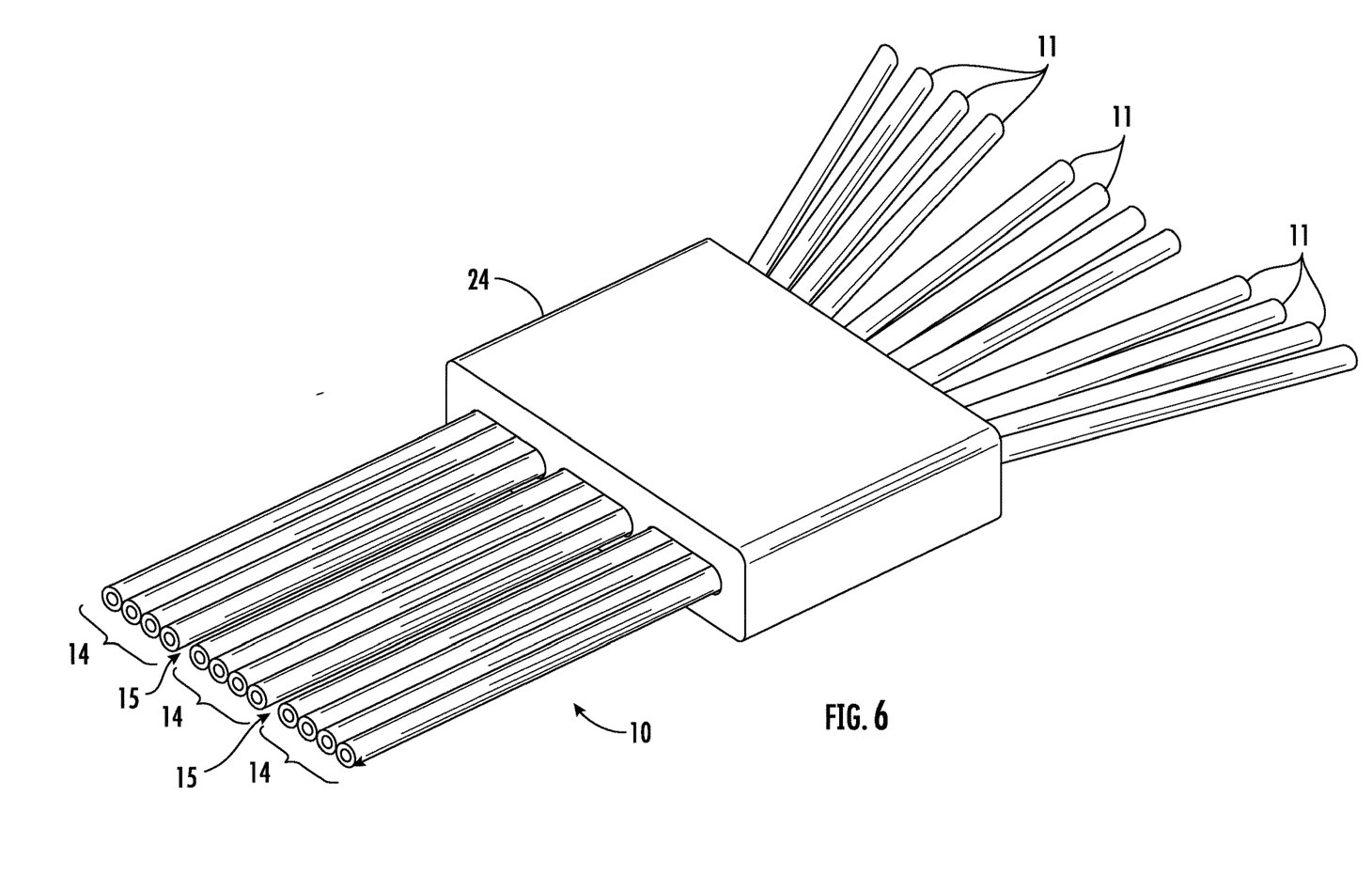
FIG. 6 is a top pictorial view depicting a portion of FIG. 5 in accordance with the first embodiment of this disclosure.

As shown in the process schematic depicted in FIGS. 5-6 (processing from right to left), a plurality n of optical fibers 11 (e.g., 12 or 24 reduced-diameter optical fibers) are arranged into a longitudinal optical-fiber assembly 10 in which the n optical fibers 11 are distributed into a plurality U of respectively adjacent optical-fiber units 14 that are spatially separated from one another. As such, the optical-fiber assembly 10 has a width w extending crosswise to a longitudinal length of the optical-fiber assembly 10.

As shown in FIGS. 5-6, the plurality n of loose optical fibers 11 are passed through a die 24 that is configured to align the optical fibers in parallel and provide spatial separation between adjacent optical-fiber units 14. This, in turn, provides the plurality U of respectively adjacent optical-fiber units, each of which includes adjacent and substantially parallel optical fibers 11. As it exits the die 24, the optical-fiber assembly 10 is a loose arrangement of substantially parallel optical fibers 11 with no bonding between the optical fibers and having interstices or grooves between adjacent optical fibers within each optical-fiber unit 14. When employing an aggregating die 24 to align the optical fibers 11 and separate the optical-fiber units 14, the entry speed of the loose optical fibers 11 is the same as the exit speed of the longitudinal optical-fiber assembly 10.

During processing, the longitudinal optical-fiber assembly 10 advances at linear velocity v, typically at a linear speed greater than 150 meters per minute (e.g., greater than 200 meters per minute, such as greater than 300 meters per minute), while maintaining spatial separation between adjacent optical-fiber units 14. In some exemplary embodiments, the longitudinal optical-fiber assembly 10 advances at linear velocity v between 400 and 700 meters per minute (e.g., between about 500 and 600 meters per minute). As the optical-fiber assembly 10 passes near (e.g., beneath) a dispenser unit 25 (or similar dispensing device), bonding material (e.g., a curable adhesive) is applied to the optical-fiber assembly 10 to adhesively bond adjacent optical-fiber units 14 and the corresponding adjacent optical fibers 11 in the optical-fiber assembly while maintaining spatial separation between the adjacent optical-fiber units 14. For example, the bonding material may be dispensed as a continuous adhesive bead 16 (or a plurality of discontinuous beads) via a dispensing nozzle 26 to a major surface of the optical-fiber assembly 10 (e.g., its upper planar surface). Thereafter, the optical-fiber assembly with an adhesive bead is passed through a curing station 28 for curing the bonding material (e.g., a curable adhesive, such as curable ultraviolet (UV) resins). See FIG. 5.

In an exemplary process embodiment, the dispenser 25 and/or the dispensing nozzle 26 move crosswise substantially corresponding to the width w of the longitudinal optical-fiber assembly 10. In this way, the bonding material is applied as an adhesive bead 16 across at least one major surface of the optical-fiber assembly (e.g., in a pattern on the upper planar surface substantially across the width of the optical-fiber assembly). As will be understood by those having ordinary skill in the art, providing an adhesive bead "substantially across the width" of the optical-fiber assembly bonds adjacent optical fibers to yield an optical-fiber ribbon (e.g., the adhesive deposition patterns extend to the outermost opposite optical fibers in the optical-fiber assembly).

In a related process embodiment, the dispenser 25 and/or the dispensing nozzle 26 move crosswise substantially corresponding to the lateral distance (w−2d) between the two outermost optical fibers. As will be understood by those having ordinary skill in the art, this lateral distance (w−2d) is the separation between the outermost grooves in the optical-fiber assembly. As used herein, terms like "substantially corresponding to the width" and "substantially corresponding to the lateral distance" refer to the movement of a dispensing nozzle and/or the corresponding adhesive deposition patterns, which typically extend to the outermost opposite optical fibers in the optical-fiber assembly (e.g., opposite edge portions of the optical-fiber assembly).

Typically, the adhesive bead bonding adjacent optical fibers in the optical-fiber assembly forms a regular pattern (continuous or discontinuous) across the width of the optical-fiber assembly, such as a zigzag-like pattern, a sawtooth-like pattern, or a sinusoidal-like pattern having a peak-to-valley amplitude substantially between (i) the lateral distance between the two outermost optical fibers (w−2d) and (ii) the width w of the optical-fiber assembly. (Some excess bonding material may be present outside one or both outermost optical fibers in the optical-fiber ribbon.) In some exemplary process embodiments, the dispensing nozzle may pause when positioned above grooves in the optical-fiber assembly to deposit bonding material as longitudinal, rectilinear adhesive beads within the respective grooves (e.g., grooves between contiguous optical fibers).

By way of background and illustration, the respective cross-sectional areas of exemplary adhesive beads can be approximated by 125-micron equilateral-triangle sides for 250-micron optical fibers (e.g., about 0.0068 mm$^2$) and by 100-micron equilateral-triangle sides for 200-micron optical fibers (e.g., about 0.0043 mm$^2$). With a +/−20 percent estimation of bead dimensions, the respective ranges for cross-sectional areas of the beads can be approximated by 100-micron to 150-micron equilateral-triangle sides for the 250-micron optical fibers (e.g., between about 0.0043 mm$^2$ and 0.0097 mm$^2$) and by 80-micron to 120-micron equilateral-triangle sides for the 200-micron optical fibers (e.g., between about 0.0028 mm$^2$ and 0.0062 mm$^2$).

In exemplary embodiments, the dispenser 25 and/or the dispensing nozzle 26 (or other dispensing device) oscillate in a direction transverse to the longitudinal direction (i.e., in the width direction) of the optical-fiber assembly, and the optical-fiber assembly moves in the longitudinal direction, such as via a reel 29. The tip of the dispenser 25 (e.g., the dispensing nozzle 26) may oscillate (e.g., vibrate) in a transverse direction at a high frequency, such as between about 100 Hz and 200 Hz. In an exemplary process embodiment, the dispensing nozzle 26 may deliver liquid bonding material in fine droplets to the advancing optical-fiber assembly 10. Because of surface tension, the liquid bonding material—if provided in sufficient droplets at a sufficient frequency—will flow together to form adhesive beads (e.g., elongated beads).

In other exemplary embodiments, the dispenser 25 and/or the dispensing nozzle 26 (or other dispensing device) revolve in a plane parallel to a planar optical-fiber assembly. This has been observed to promote faster line speeds during the manufacturing of a continuously or intermittently bonded optical-fiber ribbon, such as an optical-fiber ribbon with a distorted sinusoidal pattern of bonding material. In this regard, an exemplary dispensing nozzle 26 is made of a capillary tube at the center of a metallic sleeve that is revolving in a substantially circular orbit via a servomotor (e.g., using belt-pulley system). Such a configuration reduces undesirable vibrations, which can be caused by the linear motion of a conventional reciprocating crank shaft as typically used with reciprocating nozzles, and avoids overlapping and/or uneven distribution of bonding material, which can occur using a conventional reciprocating crank shaft. Indeed, it has been observed that the use of a revolving nozzle helps to achieve linear velocities v between 400 and 700 meters per minute, which is about 4-5 times greater than is possible with a conventional reciprocating-crank-shaft system.

It is within the scope of the present disclosure to have either one substantially continuous adhesive bead or a series of discontinuous beads that secure (e.g., affix) the optical fibers within the optical-fiber ribbon. In an exemplary embodiment, the adhesive bead(s) are arranged on only one side of the optical-fiber assembly (i.e., a first side). For example, the bead(s) are arranged only on one major surface of the optical-fiber assembly, typically its upper surface (i.e., when the optical fibers are arranged in a ribbon-like manner rather than rolled up). As noted, the optical-fiber assembly can be viewed as a ribbon-like assembly defining an upper surface, a lower surface, and two side edges. The upper and lower surfaces (i.e., the respective major surfaces) are not completely flat, because they are formed of a substantially parallel arrangement of optical fibers. As such, the upper and lower surfaces have parallel longitudinal grooves between adjacent optical fibers. Those having ordinary skill in the art will understand the optical fibers may not be perfectly parallel but rather substantially parallel in practice.

As discussed, in exemplary optical-fiber ribbons according to the present invention, bonding material adhesively bonds adjacent optical-fiber units and the corresponding adjacent optical fibers in an optical-fiber assembly. Two such optical-fiber ribbons may be aligned and joined using a mass-fusion splicing machine. For example, corresponding 12-fiber optical-fiber ribbons may be positioned in respective 12-fiber alignment chucks and, after heat stripping, cleaning, and cleaving, the two optical-fiber ribbons may be spliced at once (e.g., the corresponding optical fibers can be simultaneously butt-spliced end-to-end in the mass-fusion splicing machine).

The optical-fiber ribbon according to the present invention may be used to form optical-fiber-cable units and optical-fiber cables. An exemplary optical-fiber-cable unit has 24 ribbons of twelve optical fibers each. Such an optical-fiber-cable unit packs 288 optical fibers into a high optical-fiber density. Accordingly, in another inventive aspect, the present invention embraces an optical-fiber-cable unit including one or more optical-fiber ribbons (also according to the present invention) surrounded by a polymeric sheath. The present invention further embraces an optical-fiber cable including one or more of the optical-fiber ribbons or optical-fiber-cable units according to the present invention.

To supplement the present disclosure, this application incorporates entirely by reference the following commonly assigned patents, patent application publications, and patent applications: U.S. Pat. No. 7,623,747 for a Single Mode Optical Fiber; U.S. Pat. No. 7,889,960 for a Bend-Insensitive Single-Mode Optical Fiber; U.S. Pat. No. 8,145,025 for a Single-Mode Optical Fiber Having Reduced Bending Losses; U.S. Pat. No. 8,265,442 for a Microbend-Resistant Optical Fiber; U.S. Pat. No. 8,600,206 for a Reduced-Diameter Optical Fiber; U.S. Pat. No. 10,185,105 for a Flexible Optical-Fiber Ribbon; U.S. Pat. No. 10,782,495 for a Flexible Optical-Fiber Ribbon; International Application No. PCT/EP2017/067454 (filed Jul. 11, 2017, and published as International Publication No. WO 2019/011417 A1 and as U.S. Patent Application Publication No. US2020/0271879 A1); International Application No. PCT/EP2018/050898 (filed Jan. 15, 2018, and published as International Publication No. WO 2019/137627 A1); International Application No. PCT/EP2018/050899 (filed Jan. 15, 2018, and published as International Publication No. WO 2019/137628 A1); U.S. patent application Ser. No. 16/856,268 (filed Apr. 23, 2020, and published as U.S. Patent Application Publication No. US2020/0386961 A1), now U.S. Pat. No. 11,256,051; and U.S. patent application Ser. No. 17/130,589 for an Optical-Fiber Ribbon with Adhesive-Free Gaps (concurrently filed Dec. 22, 2020).

Other variations of the disclosed embodiments can be understood and effected by those of ordinary skill in the art in practicing the present invention by studying the drawings, the disclosure, and the appended claims. In the claims, the word "comprising" does not exclude other elements or steps, and the indefinite article "a" or "an" does not exclude a plurality. Unless otherwise specified, numerical ranges are intended to include the endpoints.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. An optical-fiber ribbon, comprising:
   (i) a plurality n of respectively adjacent optical fibers extending in a longitudinal direction and arranged in parallel to form an optical-fiber assembly having a width w extending crosswise to a longitudinal length of the optical-fiber assembly, wherein the n optical fibers are arranged in a plurality U of respectively adjacent optical-fiber units; and
   (ii) bonding material deposited on a major surface of the optical-fiber assembly, the bonding material adhesively bonding adjacent optical-fiber units and the corresponding adjacent optical fibers in the optical-fiber assembly, wherein:
   adjacent optical fibers within each optical-fiber unit are respectively contiguous to one another;
   each adjacent pair of optical-fiber units is separated by an adhesive-free spacing for a respective portion of the optical-fiber assembly's longitudinal length, the respective adhesive-free spacings between adjacent optical-fiber units having a mean width $S_{avg}$,
   the n optical fibers have a mean diameter $d_{avg}$; and
   the respective adhesive-free spacings have a mean width $S_{avg}$ that is at least 50 percent of the mean diameter $d_{avg}$ of the n optical fibers.

2. The optical-fiber ribbon according to claim 1, wherein:
   the n optical fibers have a mean diameter $d_{avg}$; and
   the respective adhesive-free spacings have a mean width $S_{avg}$ that is at least 75 percent of the mean diameter $d_{avg}$ of the n optical fibers.

3. The optical-fiber ribbon according to claim 1, wherein:
   the n optical fibers have a mean diameter $d_{avg}$; and
   the respective adhesive-free spacings have a mean width $S_{avg}$ that is at least 100 percent of the mean diameter $d_{avg}$ of the n optical fibers.

4. The optical-fiber ribbon according to claim 1, wherein the n optical fibers are uniformly distributed into the U optical-fiber units whereby each of the U optical-fiber units has the same number $u_n$ of optical fibers.

5. The optical-fiber ribbon according to claim 4, wherein each of the U optical-fiber units has at least six optical fibers.

6. The optical-fiber ribbon according to claim 4, wherein each of the U optical-fiber units has at least 12 optical fibers.

7. The optical-fiber ribbon according to claim 4, wherein the n optical fibers are uniformly distributed into (i) two adjacent optical-fiber units whereby U=2, (ii) three respectively adjacent optical-fiber units whereby U=3, or (iii) four respectively adjacent optical-fiber units whereby U=4.

8. The optical-fiber ribbon according to claim 1, wherein the optical-fiber assembly includes between 12 and 36 optical fibers whereby 12≥n≥36.

9. The optical-fiber ribbon according to claim 1, wherein each of the n optical fibers has a nominal diameter d of between 180 microns and 200 microns.

10. The optical-fiber ribbon according to claim 1, wherein the bonding material has (i) elongation at break of at least 150 percent as measured via ASTM D638-14 and (ii) Young's modulus of between 1 MPa and 15 MPa as measured via ASTM D638-14.

11. The optical-fiber ribbon according to claim 1, wherein, for a portion of the optical-fiber assembly's longitudinal length, the bonding material comprises a continuous bead of bonding material.

12. The optical-fiber ribbon according to claim 1, wherein, for a portion of the optical-fiber assembly's longitudinal length, the bonding material comprises a plurality of successive rectilinear beads arranged lengthwise along the optical-fiber assembly, wherein the beads are configured to form elongated bonds between adjacent optical fibers in the optical-fiber assembly.

13. An optical-fiber ribbon, comprising:
(i) a plurality n of respectively adjacent optical fibers extending in a longitudinal direction and arranged in parallel to form a substantially planar optical-fiber assembly having a width w extending crosswise to a longitudinal length of the optical-fiber assembly, wherein the n optical fibers have the same nominal diameter d of between 180 microns and 200 microns, wherein the n optical fibers are uniformly distributed into a plurality U of respectively adjacent optical-fiber units whereby each of the U optical-fiber units has the same number $u_n$ of optical fibers, and wherein adjacent optical fibers within each optical-fiber unit are respectively substantially contiguous to one another; and
(ii) bonding material deposited on a major surface of the optical-fiber assembly, the bonding material adhesively bonding adjacent optical-fiber units and the corresponding adjacent optical fibers in the optical-fiber assembly, wherein each adjacent pair of optical-fiber units is separated by a longitudinal adhesive-free spacing for a respective portion of the optical-fiber assembly's longitudinal length, the respective longitudinal adhesive-free spacings having a mean gap width $S_{avg}$, wherein:

$S_{avg} \geq (0.1 \cdot n \cdot (d_{250}-d)) \div (U-1)$, where $d_{250}$ is 250 microns, the nominal width of a conventional optical fiber.

14. The optical-fiber ribbon according to claim 13, wherein the respective longitudinal adhesive-free spacings have a mean gap width $S_{avg}$, wherein:

$S_{avg} \geq (0.15 \cdot n \cdot (d_{250}-d)) \div (U-1)$, where $d_{250}$ is 250 microns, the nominal width of a conventional optical fiber.

15. The optical-fiber ribbon according to claim 13, wherein the respective longitudinal adhesive-free spacings have a mean gap width $S_{avg}$, wherein:

$S_{avg} \geq (0.25 \cdot n \cdot (d_{250}-d)) \div (U-1)$, where $d_{250}$ is 250 microns, the nominal width of a conventional optical fiber.

16. The optical-fiber ribbon according to claim 13, wherein the mean gap width $S_{avg}$ of the respective adhesive-free spacings is at least 50 percent of the mean diameter $d_{avg}$ of the n optical fibers.

17. The optical-fiber ribbon according to claim 13, wherein the mean gap width $S_{avg}$ of the respective adhesive-free spacings is at least 75 percent of the mean diameter $d_{avg}$ of the n optical fibers.

18. The optical-fiber ribbon according to claim 13, wherein the mean gap width $S_{avg}$ of the respective adhesive-free spacings is at least 100 percent of the mean diameter $d_{avg}$ of the n optical fibers.

19. The optical-fiber ribbon according to claim 13, wherein the n optical fibers are uniformly distributed into (i) two adjacent optical-fiber units whereby U=2, (ii) three respectively adjacent optical-fiber units whereby U=3, or (iii) four respectively adjacent optical-fiber units whereby U=4.

20. The optical-fiber ribbon according to claim 13, wherein the optical-fiber assembly includes between 12 and 36 optical fibers whereby 12≥n≥36.

21. The optical-fiber ribbon according to claim 13, wherein, for a portion of the optical-fiber assembly's longitudinal length, the bonding material comprises a continuous bead of bonding material deposited directly on the corresponding adjacent optical fibers within each optical-fiber unit.

22. The optical-fiber ribbon according to claim 13, wherein, for a portion of the optical-fiber assembly's longitudinal length, the bonding material comprises a plurality of successive elongated rectilinear beads deposited on a major surface of the optical-fiber assembly and arranged lengthwise along the optical-fiber assembly, wherein the beads are configured to form elongated bonds between adjacent optical fibers in the optical-fiber assembly.

* * * * *